US012809933B2

(12) United States Patent
Rust et al.

(10) Patent No.: US 12,809,933 B2
(45) Date of Patent: Nov. 24, 2026

(54) OFFLINE MODE FOR A BROWSER APPLICATION SERVICE

(71) Applicant: Figma, Inc., San Francisco, CA (US)

(72) Inventors: Georgia Rust, San Francisco, CA (US); Bersabel Tadesse, San Francisco, CA (US); Yi Tang Jackie Chui, San Francisco, CA (US); John Doherty, San Francisco, CA (US); Hans Halverson, San Francisco, CA (US)

(73) Assignee: Figma, Inc., San Francisco, CA (US)

( * ) Notice: Subject to any disclaimer, the term of this patent is extended or adjusted under 35 U.S.C. 154(b) by 59 days.

(21) Appl. No.: 18/955,386

(22) Filed: Nov. 21, 2024

(65) Prior Publication Data

US 2025/0165549 A1 May 22, 2025

Related U.S. Application Data

(60) Provisional application No. 63/601,976, filed on Nov. 22, 2023.

(51) Int. Cl.

| | |
|---|---|
| ***G06Q 10/101*** | (2023.01) |
| ***G06F 8/38*** | (2018.01) |
| ***G06F 16/178*** | (2019.01) |
| ***G06F 16/957*** | (2019.01) |

(52) U.S. Cl.

CPC ............ *G06F 16/9574* (2019.01); *G06F 8/38* (2013.01); *G06F 16/178* (2019.01); *G06Q 10/101* (2013.01)

(58) Field of Classification Search

CPC ...... G06F 16/9574; G06F 16/178; G06F 8/38; G06Q 10/101

USPC ........................................................... 709/219

See application file for complete search history.

(56) References Cited

U.S. PATENT DOCUMENTS

| | | | | |
|---|---|---|---|---|
| 12,223,262 | B1 * | 2/2025 | Rozenfeld | G06F 40/18 |
| 2017/0132327 | A1 * | 5/2017 | Teeraparpwong | G06F 16/958 |
| 2019/0364108 | A1 * | 11/2019 | Berger | H04L 67/141 |
| 2020/0334019 | A1 * | 10/2020 | Bosworth | G06F 8/34 |

FOREIGN PATENT DOCUMENTS

CN 113190226 A * 7/2021 ............. G06F 9/451

OTHER PUBLICATIONS

Machine translation of CN 113190226 (Year: 2021).*

International Search Report and Written Opinion received for Application No. PCT/US2024/057087 dated Feb. 11, 2025, 16 pages.

* cited by examiner

*Primary Examiner* — Ruolei Zong

(74) *Attorney, Agent, or Firm* — Squire Patton Boggs LLP; Sarah Mirza

(57) ABSTRACT

A computing device can execute a browser application to enable a user of the computing device to interact with a current user interface (UI) design file. The computing device can automatically preload a set of UI design files of the user from a backend network computer system into browser memory of the computing device. The computing device can detect an offline trigger on the computing device, and in response, initiate an offline mode on the browser application, where the offline mode enables the user to continue interacting with the current UI design file.

20 Claims, 10 Drawing Sheets

OFFLINE MODE FOR A BROWSER APPLICATION SERVICE

RELATED APPLICATION(S)

This application claims benefit of priority to Provisional U.S. Patent Application No. 63/601,976, filed Nov. 22, 2023; the aforementioned priority application being hereby incorporated by reference in its entirety for all purposes.

TECHNICAL FIELD

Examples described herein relate to an offline user experience and out-of-memory mitigation methods for a collaborative web service.

BACKGROUND

Software design tools have many forms and applications. In the realm of application user interfaces, for example, software design tools enable designers to blend functional aspects of a program with aesthetics, resulting in a collection of pages that form the user interface of an application.

DETAILED DESCRIPTION

Figure 1A:
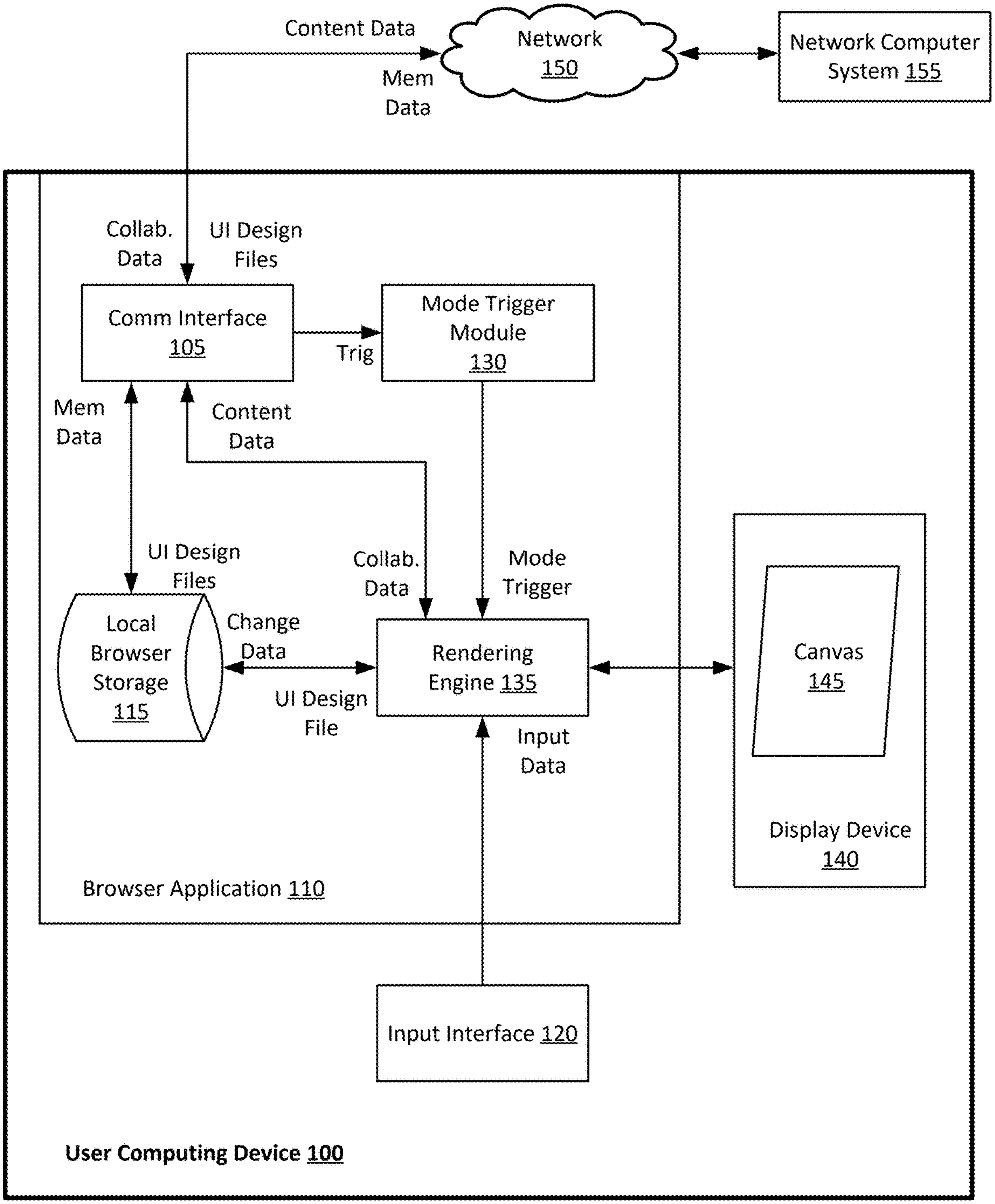
FIG. 1A is a block diagram illustrating a user computing device in communication with a network computer system, according to one or more embodiments.

Examples described herein involve providing a collaborative web service in which users can collaborate with other remote users to design user interfaces and overall user experience (e.g., for an application). In various examples, a user can execute a browser application on a computing device to interact with a current user interface (UI) design file. Each UI design file of the user can be stored in a backend computing system, and can comprise a design under edit for a particular UI or graphical user interface (GUI). As provided herein, each UI design under edit can include a set of UI pages that the user can edit to configure a user experience. As provided herein, a "design under edit" and "design in progress" may be used interchangeably, and can refer to a current UI design that is configurable and editable by the user and/or a set of remote user collaborators. According to embodiments described herein, the user and one or more remote users can each provide input to edit and configure the set of UI pages with interactive features (e.g., selectable buttons or icons, text boxes, search boxes, embedded links, links to other pages in the set of UI pages, drop down menus, etc.).

In various examples, upon executing the browser application, the computing device of the user can automatically preload, via a network communication interface of the computing device and without user input from the user, a set of UI design files of the user from the backend network computer system into a local browser storage of the computing device for the purpose of mitigating an offline condition, either on the computing device of the user or at the backend computer system. In particular, when an offline trigger is detected, either on the computing device of the user or at the backend computer system, the user is still enabled to interact with and edit the current UI design file in an offline mode. In accordance with examples described herein, the user can further open, interact with, and edit each of the UI design files that have been preloaded to the browser storage in the offline mode.

Accordingly, in response to detecting an offline trigger, the browser application executing on the computing device initiate an offline mode, where the offline mode enables the user to continue interacting with the current UI design file and further enables the user to open and interact with each of the UI design files that have been automatically preloaded to the browser storage. In certain examples, the browser application automatically preloads the set of UI design files of the user into the browser storage based on a recency in which the user interacted with each of the set of UI design files. For example, the browser storage may have the capacity to preload any number of the user's UI design files from the backend computing system. In this example, the browser application can preload the UI design files that the user has most recently opened and/or edited.

In further implementations, the backend computer system can implement one or more machine learning techniques to predict which UI design files the user is likely to open, and can cause the browser application to automatically preload these predicted UI design files. One of the factors in these machine learning techniques can comprise recency. Additional factors can include user-specific information or one or more aspects specific to the user, such as any routines of the user (e.g., the user typically opens a particular design file on a particular day of the week and/or time of day), whether a UI design file includes a comment mentioning the user or a tag linked to the user, and the like. Other machine learning predictions are also contemplated, such as the backend computer system linking to one or more third-party services of the user (e.g., email, social media, browser history, calendar, and other application services) and generating a real-time user profile that can be processed to predict which UI design files the user will want to edit in a given session.

In the offline mode, the computing device of the user can process change data corresponding to user input by the user interacting with the current UI design file or any of the preloaded UI design files in the browser storage. When the network communication interface of the user's computing device reconnects with the backend network computer system, the browser application can synchronize the change data with the current UI design file or any of the preloaded UI design files stored in the backend computer system. Accordingly, the user's changes to each UI design file managed by the browser application the browser storage in the offline mode, can be propagated to the corresponding UI design files stored at the backend when the network connection between the computing device and the network computer system is restored.

In certain implementations, the computing device of the user can receive user input from the user to create a new UI design file in the offline mode. Based on the user input, the computing device can generate, for a display component of the computing device, an interactive UI enabling the user to configure a new design under edit for the new UI design file locally. In such implementations, when the network communication interface reconnects with the backend network computer system, the computing device of the user can upload the new UI design file to the backend computer system to enable remote collaboration with the new UI design file.

As provided herein, when the browser application operates in either the offline mode or an online mode in which the browser application has a network connection to the backend network computer system, the browser application can periodically and automatically save change data in the browser storage based on the user interacting with the current UI design file the browser application. In the online mode, the computing device can further periodically and automatically propagate the change data to the current UI design file stored in the backend computer system. As such, if the browser application enters the offline mode and the user closes the current UI design file without saving, a most recent saved version may be accessible by the user from either the backend network computer system or the browser storage.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices and/or tablets), and magnetic memory. Computers, terminals, network-enabled devices (e.g., mobile devices, such as cell phones) are all examples of machines and devices that utilize processors, memory, and instructions stored on computer-readable mediums. Additionally, embodiments may be implemented in the form of computer programs, or a computer-usable carrier medium capable of carrying such a program.

System Description

FIG. 1A is a block diagram illustrating a user computing device 100 in communication with a network computer system, according to one or more examples. In various implementations, the user computing device 100 can include a communication interface 105 that communicates with a network computer system 155 over a network 150 (e.g., Wi-Fi, cellular, satellite, etc.). As provided herein, the network computer system 155 can implement a collaborative web service that enables remote users to collaborate on user interface (UI) designs that combine to provide a user experience (UX) for users of application programs.

In various examples, the user computing device 100 can comprise any personal computer, such as a tablet computer, desktop computer, laptop device, smartphone device, augmented reality (AR) or virtual reality (VR) headset device, and the like. The user computing device 100 can comprise an input interface 120, which can comprise a keyboard and mouse, a touch interface such as a track pad or touch-sensitive display, an interactive virtual display, and the like. The user computing device 100 can further include a display component 140 for displaying content to the user.

In various examples, the user computing device 100 can operate a browser application 110, which the user computing device 100 can initiate to provide access to the collaboration service implemented by the network computer system 155. The browser application 110 can be executed to initiate a network connection with the network computer system 155 to enable a plurality of remote users to collaborate on one or more designs under edit corresponding to respective UI design files. For example, the user may include an account and/or profile with the network computer system 155 that includes a set of UI design files, which the user can edit and configure until finalized.

In various implementations, when the browser application 110 is initiated, the browser application 110 can automatically load a set of UI design files of the user to the local browser storage 115 for the purpose of mitigating offline triggers, such as when the user's network connection or the network computer system's network connection fails. Such failures can occur based on network outages or power outages on either the frontend or the backend (e.g., due to storms, natural disasters, network infrastructure maintenance and upgrades, and the like). Such outages may last for several hours or even days, which can cause delays in meeting user deadlines or particular UI design files.

In previous methods, when an offline trigger occurs, the user is only able to interact with a currently loaded UI design file, even when the user wishes to access and provide input to multiple UI design files. In contrast, embodiments as described herein provide for the preloading of multiple UI design files to the local browser storage 115 so that an offline trigger will still allow the user to access and interact with any of the preloaded UI design files. For example, the user's UI design files may be stored in the backend network computer system 155 and accessible through execution of the browser application 110. During a normal session, the user can open a particular UI design file, which can comprise any number of interactive UI pages under edit.

As a background operation, the browser application 110 can preload additional UI design files of the user to the local browser storage 115 (e.g., based on recency or machine-learning predictions). When the user interacts with a particular UI design file, input data is received via the input interface 120, which can comprise keyboard/mouse inputs, stylus inputs, touch inputs, and the like. Based on the user inputs, a UI design under edit—corresponding to the UI design file—can be presented, edited, and configured by the user on a collaborative canvas 145. The user's edits on the UI design file can then be propagated to collaborative canvases presented on computing devices of any number of other users during a collaboration session.

Along these lines, contributions from the other users to a UI design under edit can be propagated as collaboration data by the network computer system 155 to the design under edit presented on the canvas 145. Accordingly, the user and the remote users can engage with each other in real time during a collaboration session to provide input and edits to the design under edit. For example, input data from the user can be processed by a rendering engine 135 of the browser application 110, which can generate content data to be displayed on the canvas 145 and transmitted over the network 150 to the network computer system 155 for propagation to the computing devices of other users in the collaboration session. As described, the browser application 110 also propagates the inputs provided by the other participants to the collaborative canvas 145 presented on the display component 140 of the user computing device 100. In certain examples, the browser application 110 can execute scripts, code, and/or other logic (the "programmatic components") to implement the functionality of the rendering engine 135 described herein.

In certain examples, the browser application 110 can be implemented as web code that can include (but is not limited to) Hyper-Text Markup Language (HTML), JAVASCRIPT, Cascading Style Sheets (CSS), other scripts, and/or other embedded code which the browser application 110 receives from a network site. For example, the browser application 110 can execute web code that is embedded within a web page. The web code can also cause the browser application 110 to execute and/or retrieve other scripts and programmatic resources (e.g., libraries) from the network site and/or other local or remote locations. By way of example, the browser application 110 may include JAVASCRIPT embedded in an HTML resource (e.g., web page structured in accordance with HTML 5.0 or other versions, as provided under standards published by W3C or WHATWG consortiums) that is executed by the browser application 110. In some examples, the content rendering engine 135 of the browser application may utilize graphics processing unit (GPU) accelerated logic, such as provided through WebGL (Web Graphics Library) programs which execute Graphics Library Shader Language (GLSL) programs that execute on GPUs.

In some implementations, the rendering engine 135 can generate the collaborative canvas 145 using programmatic resources that are associated with a browser application (e.g., an HTML 5.0 canvas). As an addition or variation, the rendering engine 135 can trigger or otherwise cause the collaborative canvas 145 to be generated using programmatic resources and data sets (e.g., canvas parameters) which are retrieved from local (e.g., memory) or remote sources (e.g., from network computer system 155).

The browser application 110 may also retrieve programmatic resources that include an application framework for use with the collaborative canvas 145. The application framework can include data sets that define or configure a set of interactive graphic tools that integrate with the collaborative canvas 145. For example, the interactive graphic tools may enable the user to provide input for creating and/or editing a design interface.

Additionally, the rendering engine 135 can interpret an input action of the user based on the location of the detected input (e.g., whether the position of the input indicates selection of a tool, an object rendered on the collaborative canvas 145, or region of the canvas 145), the frequency of the detected input in a given time period (e.g., tap and hold), and/or the start and end position of an input or series of inputs (e.g., start and end positions of a drag input), as well as various other input types which the user can specify (e.g., pinch, zoom, scroll, etc.) through one or more input devices. In this manner, the rendering engine 135 can interpret, for example, a series of inputs as a design tool selection (e.g., shape selection based on location/s of input), as well as inputs to define properties (e.g., dimensions) of a selected shape.

In various examples, the rendering engine 135 operates to generate the user interface-which can include a design in progress-presented on the display component 140. The user interface can include graphic elements and their respective properties to enable the user to edit the design under edit using the input interface 120. As an addition or alternative, the rendering engine 135 can generate a blank page for the collaborative canvas 145, and the user can interact with various displayed tools to initiate a design under edit. As rendered, the design under edit can include graphic elements such as a background and/or a set of objects (e.g., shapes, text, images, programmatic elements), as well as properties of the individual graphic elements.

Each property of a graphic element can include a property type and a property value. For an object, the types of properties include shape, dimension (or size), layer, type, color, line thickness, font color, font family, font size, font style, and/or other visual characteristics. Depending on implementation details, the properties reflect attributes of two- or three-dimensional designs. In this way, property values of individual objects can define visual characteristics such as size, color, positioning, layering, and content for elements that are rendered as part of the design in progress.

Individual design elements may also be defined in accordance with a desired run-time behavior. For example, some objects can be defined to have run-time behaviors that are either static or dynamic. The properties of dynamic objects may change in response to predefined run-time events generated by the underlying application that is to incorporate the design in progress. Additionally, some objects may be associated with logic that defines the object as being a trigger for rendering or changing other objects, such as through implementation of a sequence or workflow. Still further, other objects may be associated with logic that provides the design elements to be conditional as to when they are rendered and/or their respective configuration or appearance when rendered. Still further, objects may also be defined to be interactive, where one or more properties of the object may change based on user input during the run-time of the application.

The rendering engine 135 can process input data corresponding to user inputs, where the input data indicates (i) an input action type (e.g., shape selection, object selection, sizing input, color selection), (ii) an object or objects that are affected by the input action (e.g., an object being resized), (iii) a desired property that is to be altered by the input action, and/or (iv) a desired value for the property being altered. The rendering engine 135 can implement changes indicated by the input data to locally update active workspace data presented on the display component 140. The rendering engine 135 can update the collaborative canvas 145 to reflect the changes to the affected objects in the design under edit.

In various implementations, the browser application 110 can include a mode trigger module 130 that can detect memory triggers (e.g., initial memory triggers and critical memory triggers) as well as offline triggers that indicate that either the user computing device 100 or the network computer system 155 has lost network connectivity. When an offline trigger is detected, the collaboration session is terminated and the contributions from the user and the remote users in the collaboration session are no longer propagated in real time.

According to embodiments described herein, when an offline trigger is detected by the mode trigger module 130, the browser application 110 can initiate an offline mode in which the user may still engage with a current UI design file that is open and presented on the canvas 145, as well as the set of UI design files that were automatically preloaded by the browser application 110 at launch. For example, the design under edit of a particular UI design file can include a set of functions that enables the user to edit and configure individual UI pages, which are preserved in the offline mode. Additionally, the user can open one of the UI design files preloaded to the local browser storage 115, and edit and configure the individual UI pages of that UI design file accordingly. Change data corresponding to the user's edits and configurations can be saved automatically by the browser application 110 in the local browser storage 115.

In embodiments, an offline mode trigger can further cause the rendering engine 135 to cease transmitting content data to the network computer system 155, and instead have change data corresponding to user inputs on the UI design under edit stored in the local browser storage 115. According to examples, when network connectivity is restored the mode trigger module 130 can detect an online trigger, and cause the browser application 110 to operate in a normal online mode and/or restore the collaboration session. The change data corresponding to the user's input during the offline mode can be propagated to the corresponding UI design file(s) stored at the network computer system 155, and thus propagated to the UI design(s) under edit presented on the computing devices of the remote users in the collaboration session.

In further implementations, the browser application 110 can facilitate the user in creating a new UI design file in the offline mode. For example, the browser application 110 can include local functionality for creating, editing, and configuring a new UI design file with any number of UI pages having functionality designed by the user. The new UI design can include an initial template presented on the canvas 145, or a pre-saved template comprising any shapes, interactive features (e.g., selectable buttons, text boxes, search boxes, icons, etc.). The user can make changes and functional edits to each UI feature of the new design, which the browser application 110 can cache or save in the local browser storage 115 (e.g., automatically or in response to user input) as a new UI design file.

When the mode trigger module 130 detects network connectivity, the browser application 110 can automatically upload the new UI design file to the network computer system 155 and enable access to the new UI design file to any remote collaborator associated with the new UI design file (e.g., a collaborator list inputted by the user, or preselected list based on a contract or employment). In the online mode, synchronization of change data provided by user collaborators on a design under edit presented on the common canvas 145 can occur in real time. For any user operating in offline mode, the change data provided by that user can be synchronized to the design under edit presented on the other collaborators' devices via the network computer system 155.

In certain examples, to prevent change conflicts in designs under edit, the network computer system 155 can enforce a "last write wins" rule for each UI design file. For example, a collaboration session between five users can involve each of the five users providing input and edits to a design under edit of a UI design file. One of the collaborators may lose connectivity, enter an offline mode, and as provided herein, continue to provide change data to the design under edit. In the offline mode, this change data is not propagated to the other collaborators currently in the collaboration session. When the offline user is reconnected, the change data provided by the user in the offline mode can be automatically propagated and/or synchronized to the design under edit presented on the canvas of the other collaborators, which can cause an overwrite of certain changes made by those collaborators.

In variations, the changes made by an offline user will not overwrite any changes made by the online collaborators when the offline user is reconnected. For example, if an offline user has made significant changes to a particular UI design file and online collaborators have also made significant changes that deviate from the offline user's changes, the network computer system 155 may automatically preserve the online collaborators' changes while placing the offline user's changes in a different version of the UI design file (e.g., a version that requires approval from one or more other collaborators). As another example, the network computer system 155 can provide each online collaborator with a preview of the changes made by the offline user, which can either be accepted in full, accepted in part, or rejected by the other collaborators. In further variations, the changes made by an offline user can be presented in a newly created UI page automatically generated by the network computer system 155, which can be added to the UI design file for consideration by the group of collaborators.

In various implementations, autosave functions can be implemented in the offline mode, in which the browser application 110 automatically caches change data to the local browser storage 115. When the network connection between the user computing device 100 and the network computer system 155 is restored, the change data is automatically synchronized with the UI design file at the network computer system 155 and/or propagated to the UI design under edit presented on the canvas of the computing devices of other user collaborators. In further implementations, the local browser storage 115 can also automatically preserve saved changes in the offline mode even when the UI design file is unexpectedly closed (e.g., if the user closes the file without saving, the browser crashes, etc.). For example, the browser application 110 can periodically take a snapshot of the UI design file and save the snapshot to the local browser storage 115, which can be used to restore a last state of the UI design file.

As described herein, the network computer system 155 implementing the collaboration service can select UI design files for each user to be automatically preloaded to the local browser storage 115. In one example, the network computer system 155 selects UI design files based on recency of use. In an example, if the local browser storage 115 has capacity to store a number of UI design files, the network computer system 155 can select that number of the most recent UI design files with which the user interacted.

Other select methods of UI design files for preloading are contemplated, such as machine learning methods that account for individual behaviors, preferences, and or routines. In one example, the user may establish a set of preferred UI design files for preloading. In this example, the user provides input (e.g., in a preference menu) that can rank or select UI design files by importance to the user. These may be preloaded upon the user initiating the browser application 110.

In further examples, the network computer system 155 can perform machine learning techniques to predict which UI design files the user is likely to require in any given collaboration session. Certain factors may be used, such as learned activity data, routines, or behaviors (e.g., the user routinely accessing a UI design file on a specific time of day and/or day of the week), whether the user was tagged or pinged in a particular UI design file, when the user's name was included in a comment on a particular UI design file, and the like. In further aspects, the network computer system 155 may have information access to other applications and data on the user computing device 100, which can indicate which UI design files the user is likely to access. Such information may include calendar data indicating collaboration sessions and/or meetings the user is to attend that require access to a particular UI design file. As provided herein, the network computer system 155 can make a machine learned prediction based on the individual characteristics or information associated with the user to select with UI design files to preload to the local browser storage 115 upon initiation of the browser application 110.

According to embodiments described herein, execution of the browser application 110 provides the user with a threshold amount of available browser memory (e.g., either a browser limit or a limit enforced by the network computer system 155, such as a three-gigabyte maximum). The network computer system 155 may enforce a browser memory limit that is below the actual available memory limit of the user's browser (e.g., for the purpose of out-of-memory warnings and events).

Embodiments described herein recognize that a single UI design file or multiple UI design files saved and/or preloaded to the local browser storage 115 can be memory intensive. For example, when the user and/or collaborators add to and configure a UI design file to comprise several UI pages with various functionality, browser memory is increasingly consumed by the UI design file. When a critical memory threshold is exceeded (e.g., the browser limit), the user is typically locked out of being able to use the browser, either to engage with the browser application 110 or to perform any other browser functions.

According to examples provided herein, the browser application 110 and/or network computer system 155 can operate to monitor memory data from the browser memory of the user, where the memory data indicates current browser memory usage. When the browser memory usage reaches a first memory threshold (e.g., 65% of the enforced browser memory limit), the network computer system 155 can perform a first intervention to attempt to induce the user into using less browser memory. In accordance with examples provided herein, the first intervention can involve a menu (e.g., a pop-up menu or sidebar menu) that overlays the user interface presented on the display component 140.

In various examples, the menu can include memory usage warning to the user and a listing of UI elements (e.g., UI pages of a current UI design file) with a memory usage indicator associated with each element. In certain examples, the user is prevented from continuing until one or more pages are deleted, copied to a different file, or archived. In variations, the user can choose to ignore the warning and continue to work on the current UI design file. In accordance with embodiments provided herein, the user can reduce browser memory usage by interacting with the menu of UI elements, deleting one or more elements, or archiving one or more elements.

Accordingly, in response to the first memory trigger, the mode trigger module 130 can communicate a mode trigger to the rendering engine 135 to present the menu and temporarily halt user interactivity with the design under edit. The user may archive one or more UI pages by selecting each UI page and selecting an "archive" feature. Upon doing so, the network computer system 155 can store the data corresponding to the functionality and editability of the particular UI page, and associate the data with a preview or screenshot of the UI page, which can still be presented on the display component 140. Thus, the memory intensive data associated with the UI page is transferred from the browser memory to the network computer system 155, and the browser memory usage for the archived page is significantly reduced.

The browser memory usage indicators on the menu can reflect the user's actions of archiving, deleting, and/or copying UI pages, and can be updated in real time. In such examples, when the user successfully archives one or more UI pages, the UI pages may still be accessible and unarchived at the user's discretion. As such, the first intervention and menu can be removed until the first memory threshold is exceeded again.

In certain implementations, the user may disregard the first intervention and continue interacting with the design under edit corresponding to a particular UI design file. If the browser memory usage exceeds a critical memory threshold (e.g., 100% of the enforced browser memory limit), the mode trigger module 130 can trigger a recovery mode on the browser application 110. The recovery mode prevents the user from engaging with the browser application 110 and any UI design file, with the only functions available being the ability to archive, delete, or copy UI pages or elements to decrease memory usage.

According to such examples, upon triggering the recovery mode, the network computer system 155 can temporarily increase the allowable browser memory 115 (e.g., to 105% of enforced memory) to enable the limited functionality of restoring browser memory usage to below the critical memory threshold. In some embodiments, the recovery mode can induce the user to archive, delete, and/or copy UI pages or elements of the UI design file until the browser memory usage is below the first memory threshold. In either case, the user is locked out of engaging with UI design and collaboration functions of the browser application 110 until the respective threshold is met.

For archived pages, the user may still view a preview of the archived page on the collaborative canvas 145 or user interface presented on the display component 140. In accordance with examples provided herein, the user can unarchive or reinstate an archived page by selecting the preview or a menu associated with the preview. Selection of the preview or menu can result in an "unarchive" feature that, when selected, causes the browser application 110 to retrieve the stored functionality data at the network computer system 155 and restore the UI page to its configured functions prior to archiving.

Examples described herein provide for mitigations to network errors and outages, as well as out-of-memory events. Any combination of the methods described herein may be used for such mitigations, which can include offline mode functions (e.g., when the critical memory threshold is exceed and recovery mode is initiated), memory usage warnings and interventions, UI page archiving features, and UI page reinstatement features. These methods amount to technical improvements in the field of general UI design, and need not be limited to remote collaborations with other users.

Collaborative Network Platform

Figure 1B:
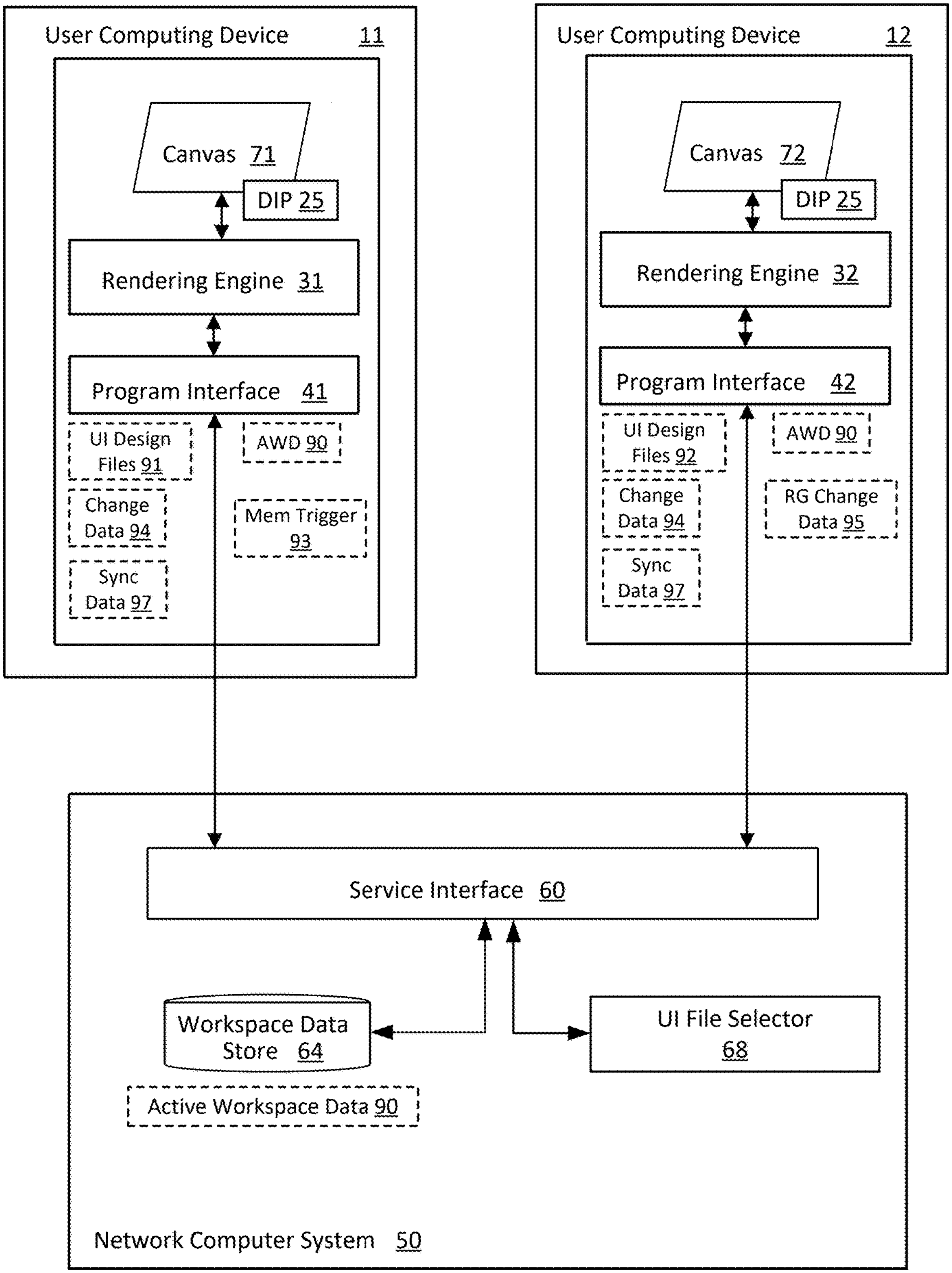
FIG. 1B illustrates a network computer system implementing a collaborative web service, according to one or more embodiments.

FIG. 1B illustrates a network computer system implementing a collaborative web service, according to one or more examples. In an example of FIG. 1B, a collaborative network platform is implemented by the network computer system 50, which communicates with multiple user computing devices 11-12 over one or more networks (e.g., the World Wide Web) to present a shared, collaborative design interface on the user computing devices 11-12. While FIG. 1B illustrates an example in which two users utilize the collaborative network platform, examples as described allow for the network computer system 50 to enable collaboration on design interfaces among users using a larger number of user computing devices. Among other advantages, the collaborative network platform allows users to more concurrently access a design interface, and to conveniently manipulate objects while the network computer system 50 manages synchronization and access issues.

With respect to FIG. 1B, the user computing devices 11-12 can be operated by users that are associated with a common account or accounts associated with a particular design in progress 25. Each user computing device 11-12 presents the design in progress 25 on a collaborative canvas 71-72 presented on each device during respective sessions. As such, each of the user computing devices 11-12 may access a set of active workspace data 90 at the same time using respective program interfaces 41-42 on each of the user computing devices 11-12.

In examples, the service interface 60 can load the active workspace data 90 corresponding to the design in progress 25 from a workspace data store 64, and transmit a copy of the active workspace data 90 to each user computing device 11-12 such that the respective rendering engines 31-32 render the design in progress 25 corresponding to the active workspace data 90 at the same time, such as during overlapping sessions.

In some examples, the network computer system 50 can continuously synchronize the active workspace data 90 corresponding to the design in progress 25 presented on the user computing devices 11-12. Thus, changes made by users to the design in progress 25 on one user computing device 11 may be reflected on the design in progress 25 rendered on the other user computing device 12 in real-time. By way of example, when a change is made to the design in progress 25 at one user computing device 11, the respective rendering engine 31 updates the respective canvas 71 locally and transmits change data 94 corresponding to the changes to the service interface 60 of the network computer system 50 (e.g., via web-content rendering engine 135).

The service interface 60 processes the change data 94 from the user computing device 11 and uses the change data 94 to make a corresponding change to the active workspace data 90. The service interface 60 can also transmit remotely-generated change data 95 (which in the example provided, corresponds or reflects the change data 94 received from the user computing device 11) to the other user computing device 12 that has loaded the same design in progress 25, causing the corresponding rendering engine 32 to generate the changes to the design in progress 25 accordingly, such as by causing the program interface 42 and rendering engine 32 to update the respective collaborative canvas 72. In this manner, active workspace data 90 is synchronized across any number of user computing devices 11-12 that are using the respective workspace data 90.

In certain examples, to facilitate the synchronization of the active workspace data 90 at the user computing devices 11-12 and the network computer system 50, the network computer system 50 may implement a stream connector to merge data streams between the network computer system 50 and user computing devices 11-12 that have loaded the same design in progress 25. For example, the stream connector may merge a first data stream between user computing device 11 and the network computer system 50 with a second data stream between user computing device 12 and the network computer system 50. In some implementations, the stream connector can be implemented to enable each computing device 11-12 to make changes to the server-side active workspace data 90 without added data replication that may otherwise be required to process the streams from each user computing device 11-12 separately.

In certain implementations, the network computer system 50 can include a UI file selector 68 that can determine which UI design files to preload to user computing devices of individual users of collaboration service. As provided herein, the UI file selector 68 can reference a user profile or other historical user data to determine which UI design files a particular user has most recently accessed and/or edited. As further provided herein, the UI file selector 68 can implement other selection criteria and/or machine learning techniques to predict which particular UI design files a user is likely to open.

Upon determining or predicting which UI design files the user is likely to open, the UI file selector 68 can preload those UI design files 91-92 to the browser memory of a browser executing on the user computing device 11-12. For example, when user computing device 11 initiates the browser application for presenting and making edits to a design in progress 25 on the collaborative canvas 71, the UI file selector 68 can predict which UI design files the user is most likely to wish to access, and cause those UI design files 91-92 to be preloaded to the browser memory on the user computing device 11. Thereafter, if an offline condition occurs, either on the front end (e.g., the user's network connection) or the backend (e.g., an outage at the network computer system 50), the user is still enabled to access and edit a currently opened UI design file and each of the preloaded design files in the browser memory.

In such examples, change data 94 is stored or cached locally until the network link between the user computing device 11 and the network computer system 50 is restored. Upon the network link being restored, the user computing devices can transmit synchronization data 97—based on change input provided by the user during the offline condition—to the network computer system 50 to cause the active workspace data 90 corresponding to be updated to each UI design file with which the user interacted.

In accordance with examples provided herein, the browser application executing on each user computing device 11-12 can include a memory monitor 93 that monitors memory data indicating browser memory usage of the browser application. As described above, the memory monitor 93 can provide interventions to user computing devices when the first memory threshold is met, and/or can initiate a recovery mode on the browser application executing on the user computing devices when a critical memory threshold is exceeded.

In particular, when the first memory threshold is exceeded on the browser of user computing device 11, the browser application can provide an intervention menu, which can list UI pages of a currently opened UI design file, and provide memory indicators indicating how much browser memory each UI page is consuming (e.g., a percentage of an enforced browser memory limit). The user may interact with the menu to select and archive individual UI pages, delete UI pages or UI frames of a UI page, and/or copy UI pages to a different UI design file stored at the network computer system 50. When the critical memory threshold is exceeded, the memory monitor 93 can trigger the recovery mode on the user computing device 11, which can provide a temporary increase in browser memory for the purpose of allowing the user to reduce browser memory usage to below the critical memory threshold or the first memory threshold.

Example User Interfaces

Figure 2A:
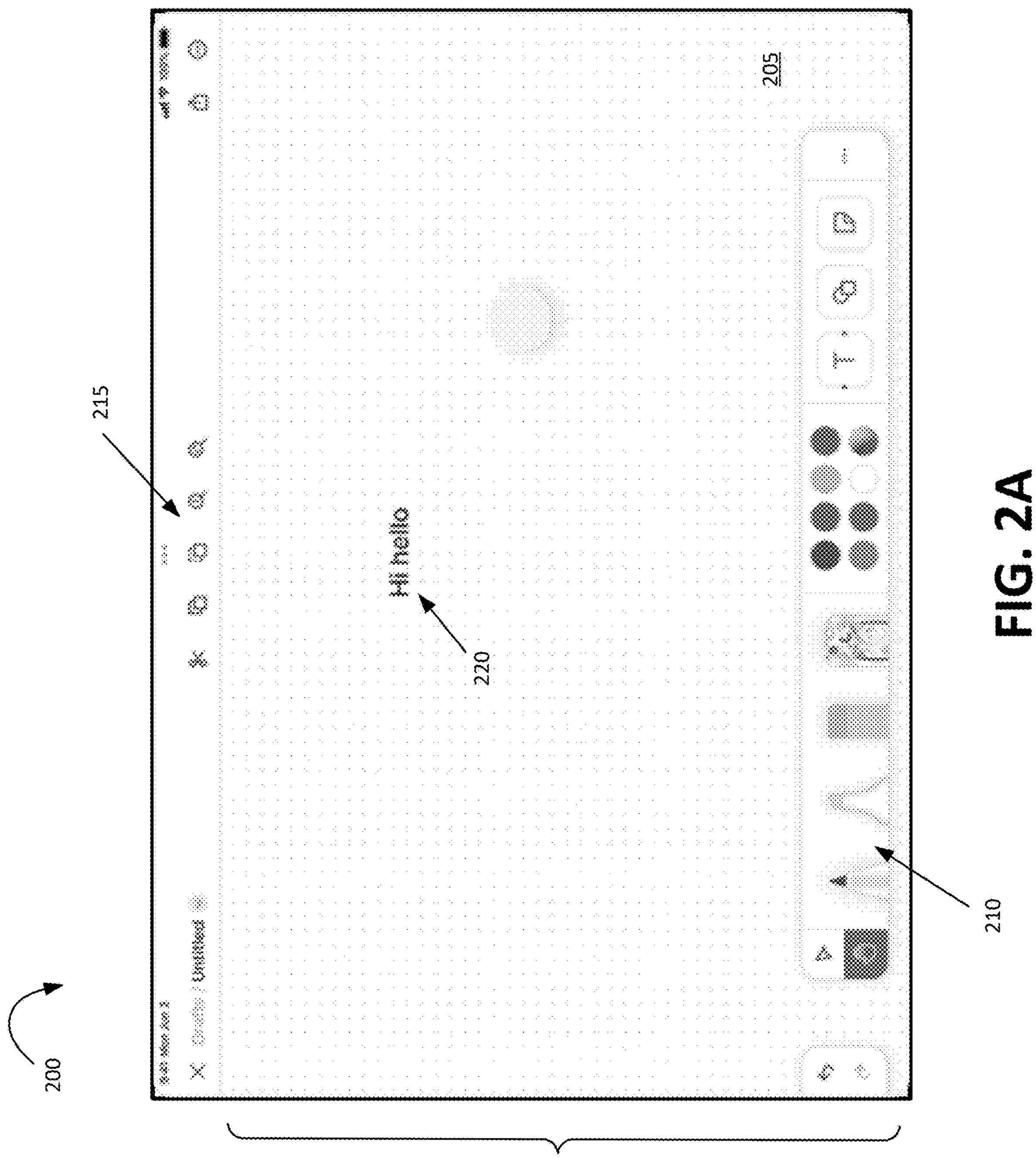
FIG. 2A illustrates an example collaboration interface for creating a user interface (UI) design file, according to one or more embodiments.

FIG. 2A illustrates an example collaboration interface for creating a user interface (UI) design file, according to one or more examples. In various implementations, the user interface 200 can be presented on a user computing device 100, as shown and described in connection with FIG. 1A, or user computing devices 11-12 of any number of collaborators participating in a collaborative session, as shown and described with respect to FIG. 1B.

In certain examples, the user interface 200 can present a collaborative canvas 205 providing an initial template for creating a UI design. The user can open the browser application corresponding to the collaborative web service, which can cause the collaborative canvas 205 to be presented, along with a creative tool bar 210 and editing tool bar 215 providing the user with creative and editing tools for designing a user interface. As provided herein, the user can initiate or join a collaboration session with any number of user collaborators to provide comment, react to, or provide emojis to the contributions of other collaborators. As shown in FIG. 2A, the user interface 200 includes a welcome message 220, and can further provide a "how to" feature or tutorial of getting started with creating a UI design.

In various examples, the user can interact with the creative tool bar features and editing tool bar features for creating a UI design, which can be saved as a UI design file. In doing so, the user can create various interface panels comprising customized shapes and functionality configured by the user and any collaborator joining the user in the collaboration session. As provided herein, the UI design file can include any number of UI pages, each of which can include UI frames and designs that can be edited by the user and user collaborators to create a particular user experience.

Figure 2B:
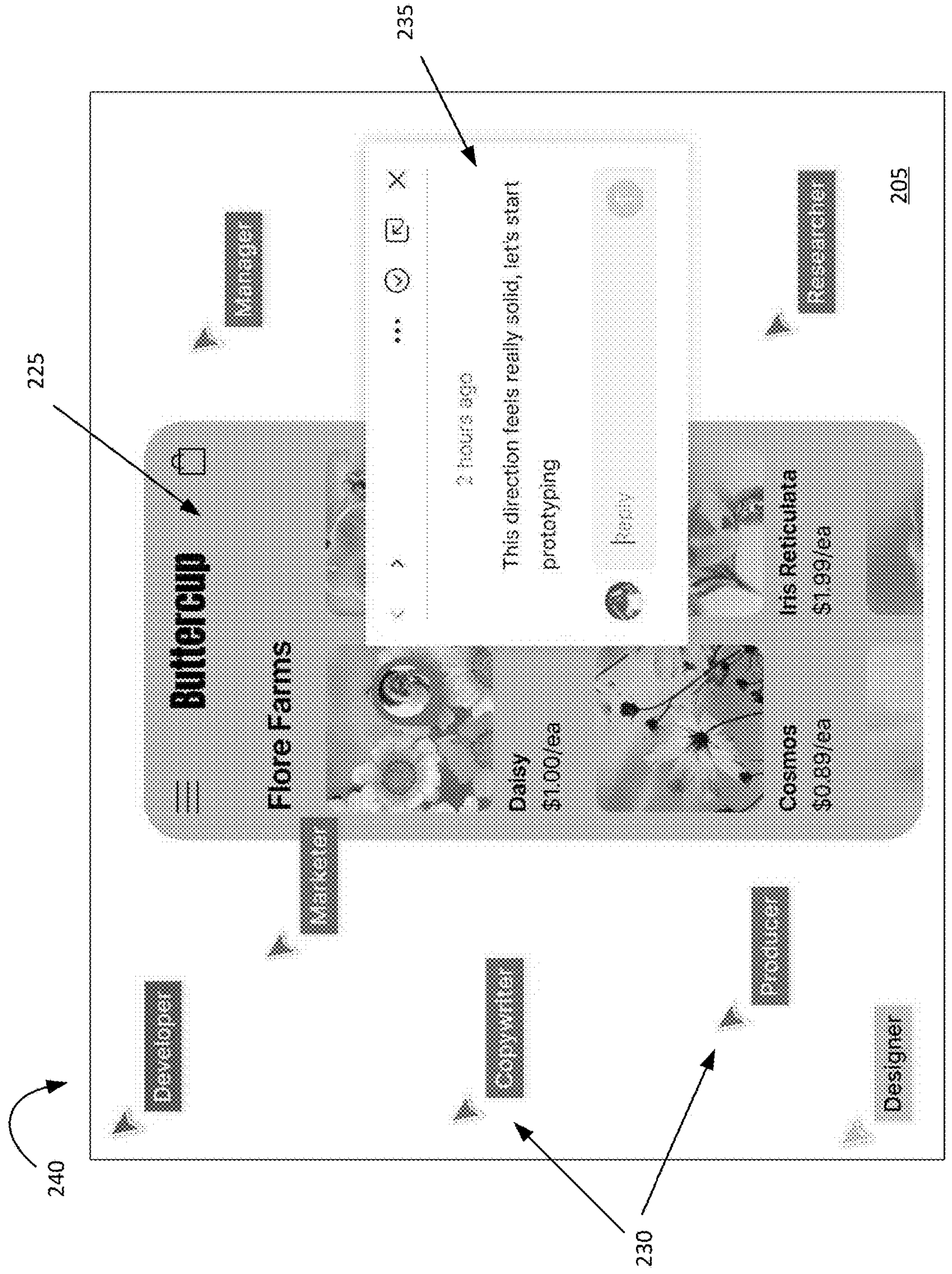
FIG. 2B illustrates an example collaboration interface during a collaboration session with multiple users collaborating on a UI design, according to one or more embodiments.

FIG. 2B illustrates an example collaboration interface 240 during a collaboration session with multiple users collaborating on a UI design, according to one or more examples. As shown in FIG. 2B, each user collaborator can be provided with a cursor indicator 230 that enables the user collaborator to provide creative input, make edits and configurations, and provide comment based on a currently presented UI design in progress.

As further shown in FIG. 2B, a UI design in progress can include a UI page 225 (e.g., for an application under design) that can include any number of configurable features (e.g., a drop-down menu feature, icons, browsing features, product or service listings, checkout and purchase features, etc.). In certain examples, the user is able to provide comments and message other user collaborators in a comment panel 235 that overlays the collaborative canvas 205. In the example shown in FIG. 2B, the collaborators may finalize a design for a particular user interface and provide comments to initiate prototyping of the UI design.

Figure 2C:
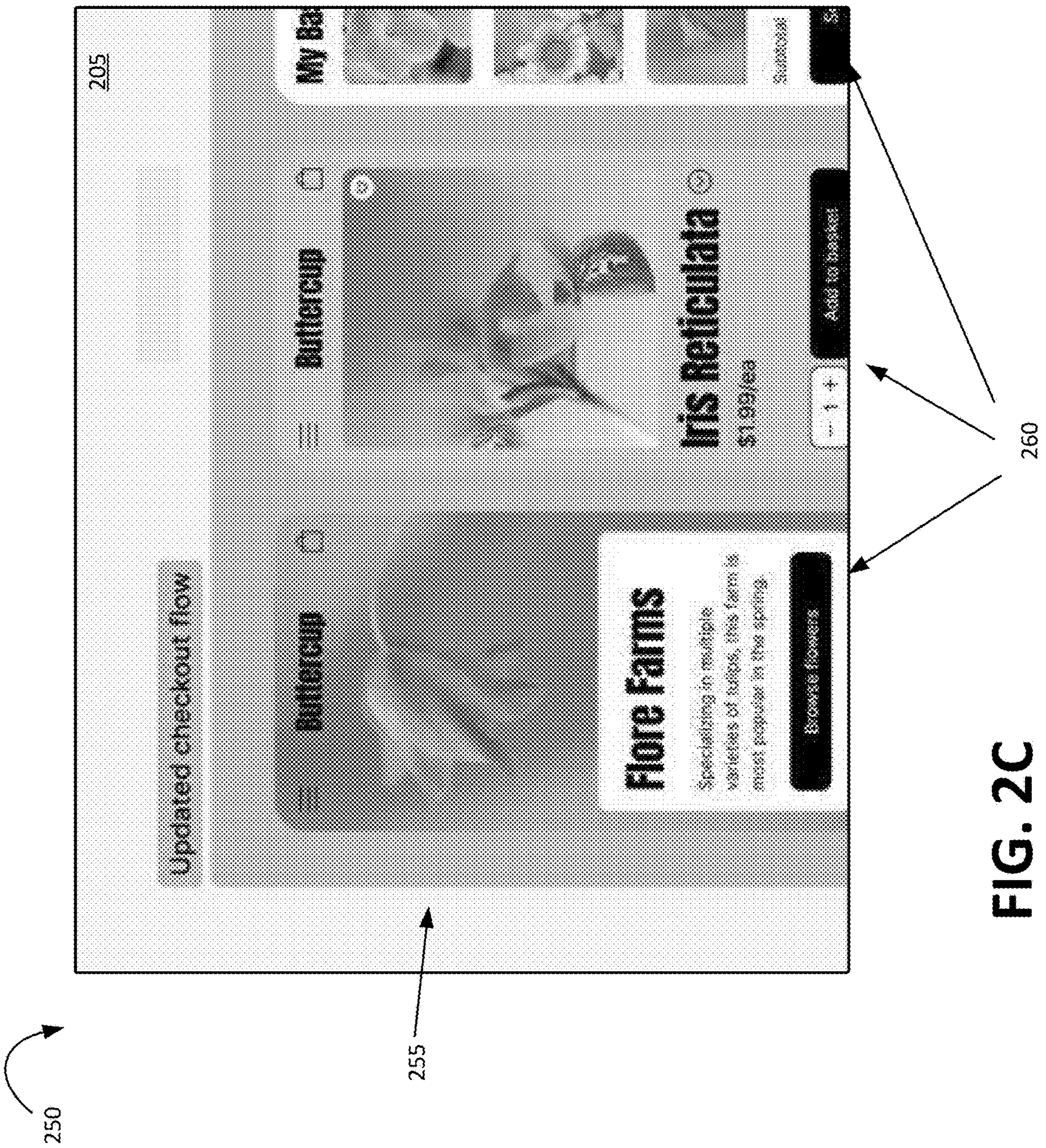
FIG. 2C illustrates an example collaboration interface for a UI design under edit that includes multiple UI frames of a UI design page, according to one or more embodiments.

FIG. 2C illustrates an example collaboration interface 250 for a UI design under edit that includes multiple UI frames 260 of a UI design page 255, as rendered on the canvas 205, according to one or more examples. In various examples, the UI design page 255 can be labeled (e.g., "updated checkout flow") to indicate the functionality of the UI frames 260 in the UI design page 255. Each UI frame can correspond to the user interface screen to be presented when a user interacts with an application and/or website. In certain examples, the user can interact with creative tools and editing tools to update the design and/or reconfigure certain functionality of a particular UI frame 260.

Figure 2D:
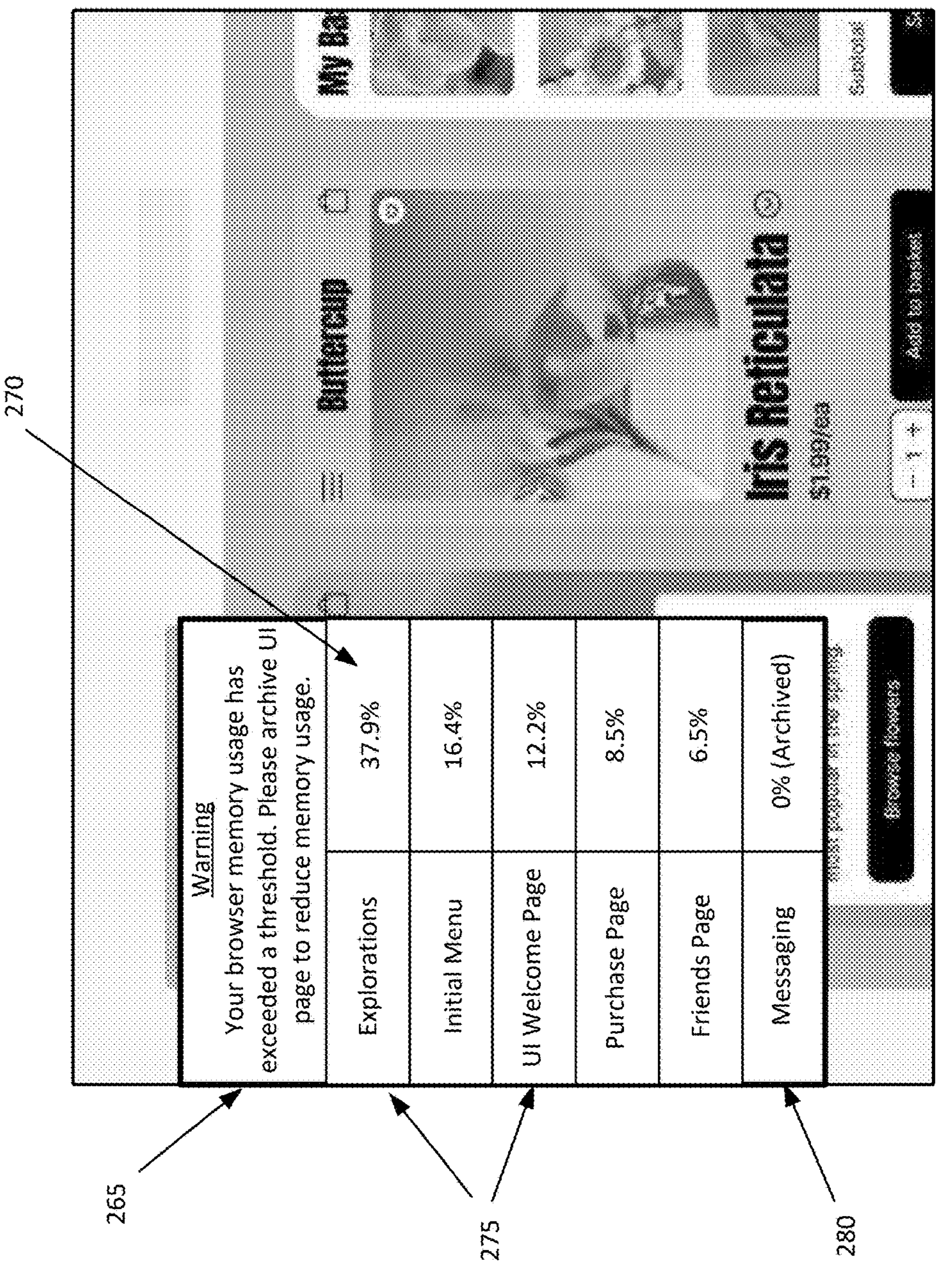
FIG. 2D illustrates an example memory threshold intervention that enables a user to reduce browser memory usage, according to one or more embodiments.

FIG. 2D illustrates an example memory threshold intervention 265 that enables a user to reduce browser memory usage, according to one or more examples. In the example shown in FIG. 2D, the memory threshold intervention 265 can comprise a UI page menu listing UI design pages 275 that are currently active in a presented design under edit, and a set of corresponding browser memory usage indicators 270 showing an amount or percentage of browser memory usage of each of the UI design pages 275.

As provided herein, the memory threshold intervention can comprise an initial warning after the browser memory usage has exceeded a first threshold (e.g., 65% of an enforce browser memory limit). For an initial memory usage warning, in certain aspects, the user can ignore or "close" the intervention 265, and/or can select certain UI pages 275 in the intervention 265 for deletion or archiving. As shown in FIG. 2D, the user has archived the "messaging" UI page, which can remove the functionality of the UI page in the browser memory and leave a preview page or screenshot of the UI page in the UI design file loaded to the user's browser memory, thereby significantly reducing memory usage of the "messaging" UI page.

Figure 2E:
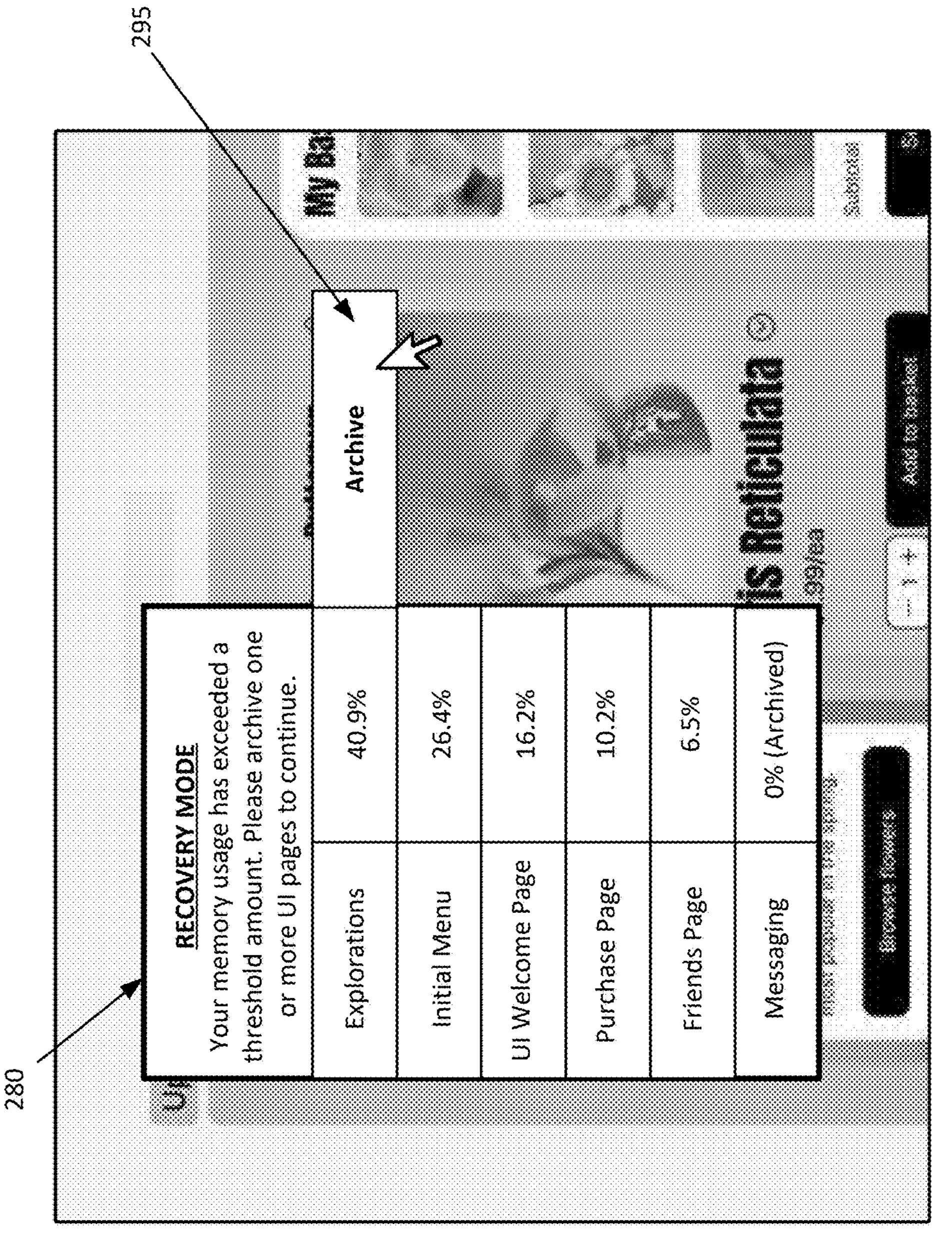
FIG. 2E illustrates an example user interface in which a recovery mode has been initiated, according to one or more embodiments.

FIG. 2E illustrates an example user interface in which a recovery mode has been initiated, according to one or more examples. In various examples, a critical memory intervention 280 can be presented to overlay the current user interface, and can comprise a final intervention when the critical memory threshold is exceeded (e.g., 100% of enforced browser memory usage). The critical memory intervention 280 can be presented in connection with a recovery mode that locks the user out of interacting with the UI design file.

As described herein, the recovery mode can temporarily increase a browser memory limit by the network computer system to enable the user to restore the browser memory usage to below the critical memory threshold or the first memory threshold (e.g., by archiving one or more UI pages). As shown in FIG. 2E, the user can interact with the critical memory intervention 280 to select from a set of listed UI pages and select an archive feature 295 that causes the selected UI page to be archived in the manner described herein. When the user meets the requirements to exit the recovery mode, the critical memory intervention 280 can be exited, and the user can continue to interact with the UI design file.

Methodology

Figure 3A:
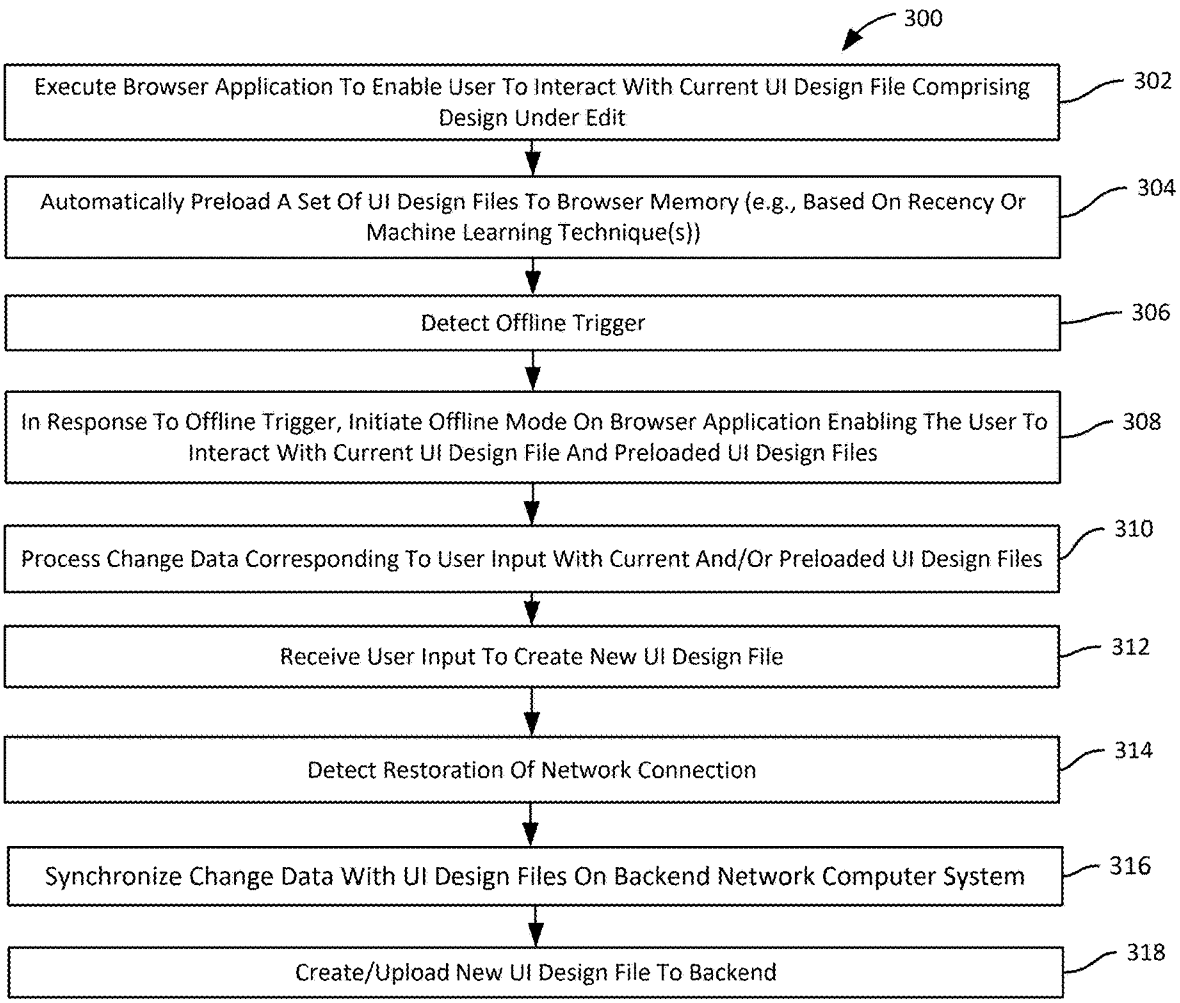
FIG. 3A illustrates an example process for implementing an offline mode for a user, according to one or more embodiments.
Figure 3B:
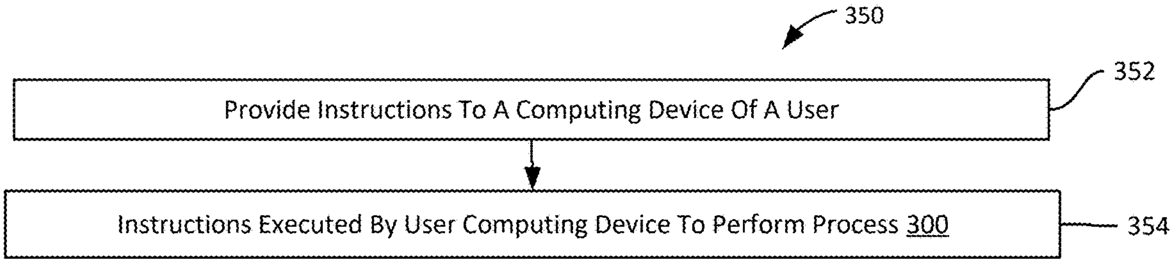
FIG. 3B illustrates an example process for a network system to provide instructions to a user computing device, to enable the user computing device to implement an offline mode, according to one or more embodiments.

FIGS. 3A and 3B illustrate example processes for implementing offline mode on user computing devices, according to embodiments. In the below description of FIG. 3A and FIG. 3B, reference may be made to reference characters representing various features as shown and described with respect to FIGS. 1A through 2E for purpose of describing functionality for performing a step or sub-step being described. Operations described with respect to FIG. 3A may be performed by an example user computing device 100 executing a browser application 110, as shown and described with respect to FIG. 1A. Operations described with respect to FIG. 3B may be performed by network computer system 155 (FIG. 1A), 50 (FIG. 1B). Still further, while the processes shown in FIG. 3A and FIG. 3B are shown in a particular order, any step of the described processes may be performed prior to, in conjunction with, or subsequent to any other step in the respective process 300, 350 of FIG. 3A and FIG. 3B.

Referring to a process 300 of FIG. 3A, in various examples, at block 302, a user computing device 100 executes a browser application 110 to enable a user of the computing device to interact with a current user interface (UI) design file, where the current UI design file comprising a design under edit for a particular UI. At block 304, the user computing device 100 can further automatically preload, via a network communication interface and without user input from the user, a set of UI design files of the user from a backend network computer system into browser memory of the computing device. As provided herein, the network computer system 155 can select which UI design files of the user to preload to browser memory 115 based on recency or a set of machine learning factors that are individual to the user.

In various examples, at block 306, the user computing device 100 can detect an offline trigger on the computing device. In response to the offline trigger, at block 308, the user computing device 100 can initiate an offline mode on the browser application 110, where the offline mode enables the user to continue interacting with the current UI design file and any of the preloaded UI design files. As provided herein, the offline mode can correspond to a disrupted network connection between the user computing device 100 and the network computer system 155 and can occur at either end (e.g., a network outage or power outage).

Furthermore, the user may experience the offline condition during a collaboration session with one or more other users. While these connections may be terminated, the user is still enabled to make changes and interact with a current UI design file and the preloaded design files in the offline mode. At block 310, the user computing device 100 process change data corresponding to user input with the current UI design file and/or any of the preloaded UI design files. In certain examples, at block 312, the browser application 110 can receive input to create a new UI design file while the browser application 110 is in the offline mode. In such a scenario, the user can interact with creative tools to configure a new design under edit in the offline mode.

At block 314, the user computing device 100 can detect a restoration of the network connection between the computing device 100 and the network computer system 155. Based on the restoration of the network connection, at block 316, the browser application 110 can communicate with the network computer system 155 to synchronize or propagate change data (corresponding to any changes, edits, and/or configurations made by the user in the offline mode) with the relevant UI design file(s) stored at the backend network computer system 155. In examples where the user has created a new UI design file in the offline mode, at block 318, the browser application 110 can create and/or upload the new UI design file to the backend network computer system 155.

When the change data is synchronized to the backend UI design file(s), any remote user collaborator that is current interacting with the UI design file(s) can view the change data being automatically propagated to the UI design file(s) in real time. In further examples, if a collaboration session is currently in progress when the user's network connection is restored, the user may receive a prompt to join the collaboration session with the other remote collaborators.

Referring to a process 350 of FIG. 3B, in various examples, at block 352, network computer system 155 can operate to provide instructions to a user computing device 110. In examples, the user computing device 100 executes a browser application 110 to receive instructions provided by the network computer system 155. The instructions enable the user computing device 100 to perform a set of operations such as described with FIG. 3A. In examples, the provided instructions can include instructions (e.g., scripts, etc.) that are transmitted to the browser application 110 of the user computing device 100 when the browser application 110 is running. As an addition or variation, the provided instructions can include instructions embedded in, for example, web resources which are accessed by the user computing devices 100 and executed by their respective browser applications 110.

At block 354, the provided instructions are executed by a user computing device in connection with the user computing device utilizing a collaboration service provided by the network computer system 155. The instructions, once executed by the user computing device 100, cause the computing device to perform operations in accordance with, for example, the process 300.

Network Computer System

Figure 4:
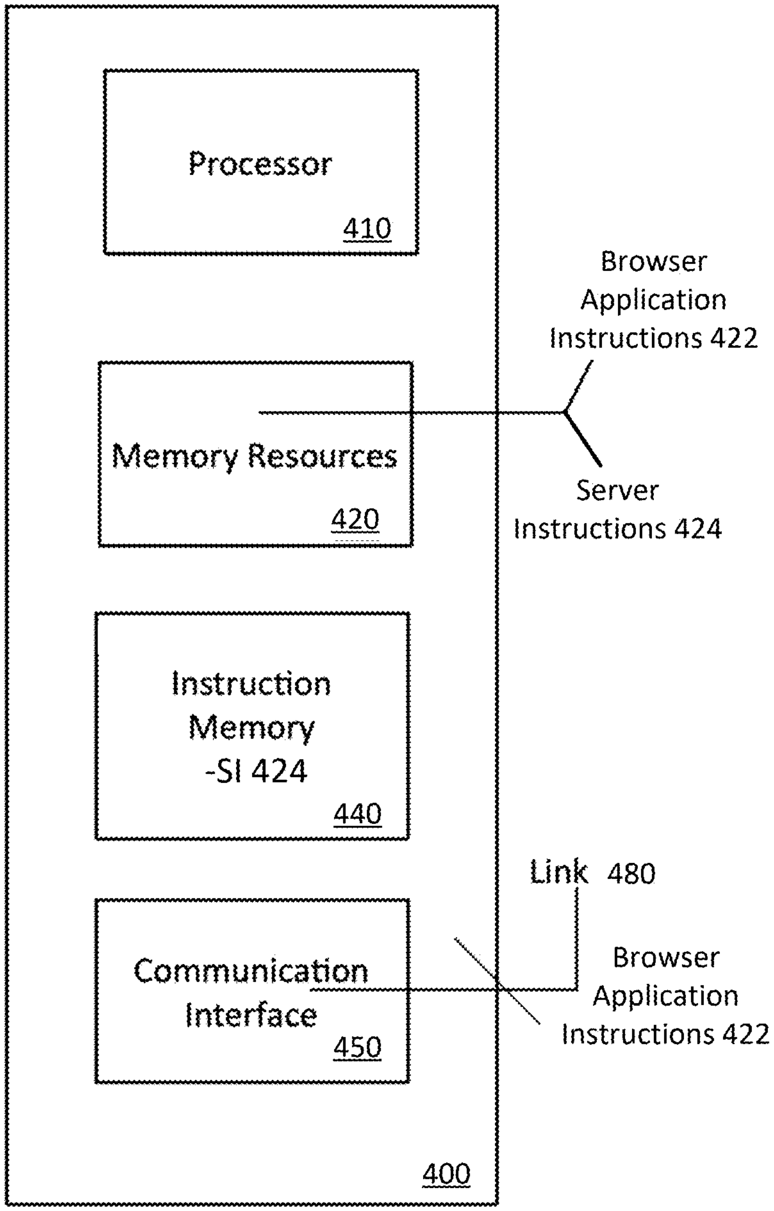
FIG. 4 is a block diagram illustrating a computer system on which one or more embodiments can be implemented.

FIG. 4 illustrates a computer system on which one or more embodiments can be implemented. A computer system 400 can be implemented on, for example, a server or combination of servers. For example, the computer system 400 may be implemented as the network computer system 155, 50 of FIGS. 1A and 1B.

In one implementation, the computer system 400 includes processing resources 410, memory resources 420 (e.g., read-only memory (ROM) or random-access memory (RAM)), one or more instruction memory resources 440, and a communication interface 450. The computer system 400 includes at least one processor 410 for processing information stored with the memory resources 420, such as provided by a random-access memory (RAM) or other dynamic storage device, for storing information and instructions which are executable by the processor 410. The memory resources 420 may also be used to store temporary variables or other intermediate information during execution of instructions to be executed by the processor 410.

The communication interface 450 enables the computer system 400 to communicate with one or more user computing devices, over one or more networks (e.g., cellular network) through use of the network link 480 (wireless or a wire). Using the network link 480, the computer system 400 can communicate with one or more computing devices, specialized devices and modules, and/or one or more servers.

In examples, the memory resources 420 can store multiple instruction sets, including a browser instruction set 422 and a server instruction set 424. The processor 410 may execute the server instruction set 424, stored with the memory resources 420, in order to enable the network computing system to implement the collaborative platform and operate as the network computer system 155, 50 in examples such as described with FIG. 1A and FIG. 1B. The computer system 400 may also include additional memory resources ("instruction memory 440") for storing executable instruction sets ("browser instructions 422") such as may be embedded with web pages or transmitted to the browser application 110, to enable user computing devices to implement functionality such as described throughout the present disclosure. The browser instructions 422 can be communicated to the computing devices of the users of the collaborative platform, to enable each of the computing devices to implement an example method such as described with FIG. 3.

As such, examples described herein are related to the use of the computer system 400 for implementing the techniques described herein. According to an aspect, techniques are performed by the computer system 400 in response to the processor 410 executing one or more sequences of one or more instructions contained in the memory resources 420. Such instructions may be read into the memory resources 420 from another machine-readable medium. Execution of the sequences of instructions contained in the memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

User Computing Device

Figure 5:
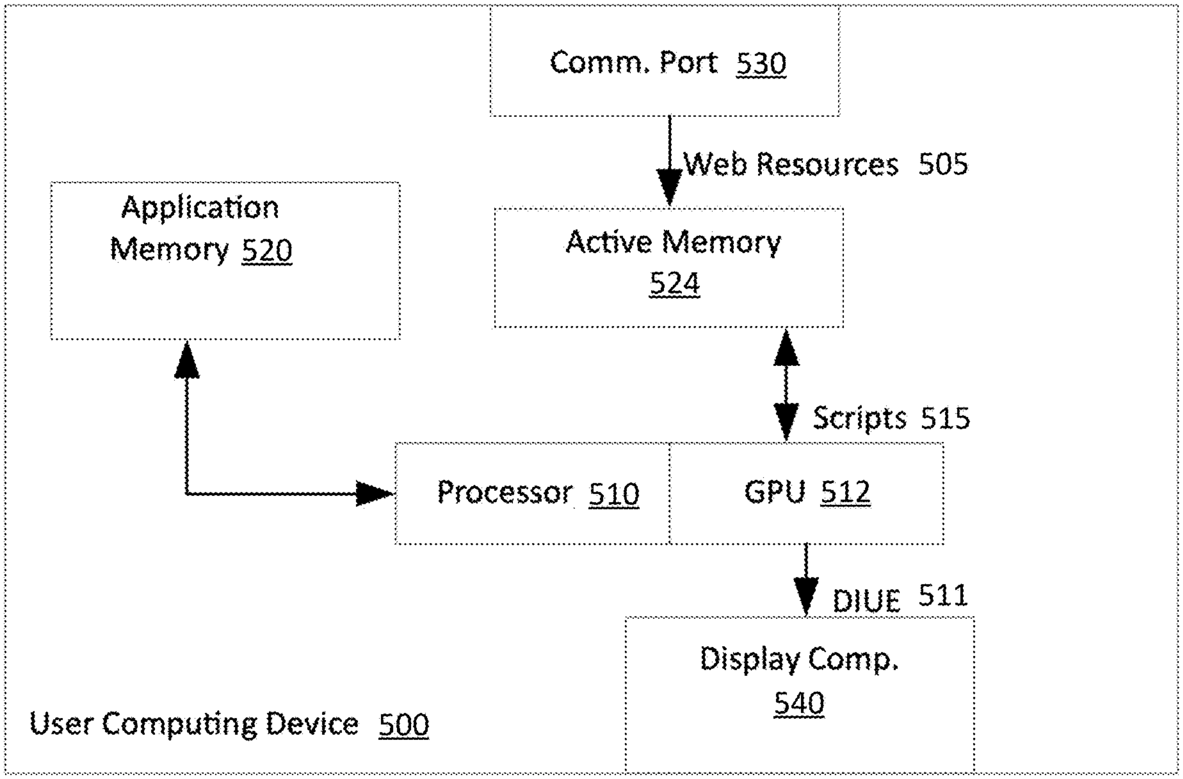
FIG. 5 is a block diagram illustrating a user computing device for use with one or more examples described herein.

FIG. 5 illustrates a user computing device for use with one or more examples, as described. In examples, a user computing device 500 can correspond to, for example, the user computing device 100 as shown and described with respect to FIG. 1A and FIG. 1B, and can comprise a smartphone, tablet computer, AR or VR headset, or other touchscreen-based personal computer having graphics processing capabilities that are suitable for enabling renderings of design interfaces and graphic design work.

In examples, the computing device 500 includes a central or main processor 510, a graphics processing unit (GPU) 512, memory resources 520, and one or more communication ports 530. The computing device 500 can use the main processor 510 and the memory resources 520 to store and launch a collaboration application. In certain examples, a user can operate the application to access a network site of the network collaboration platform, using the communication port 530, where one or more web pages or other web resources 505 for the network collaboration platform can be downloaded. In certain examples, the web resources 505 can be stored in the active memory 524 (cache).

As described by various examples, the processor 510 can detect and execute scripts and other logic which are embedded in the web resources 505 in order to implement the collaborative canvas. In some of the examples, some of the scripts 515 which are embedded with the web resources 505 can include GPU accelerated logic that is executed directly by the GPU 512.

The main processor 510 and the GPU can combine to render a design in progress on a display component 540 (e.g., touch-sensitive display device). The rendered design interface can include web content from the web aspect of the hybrid application, as well as design interface content and functional elements generated by scripts and other logic embedded with the web resources 505.

Conclusion

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computer system comprising:

a display component;

a network communication interface;

one or more processors; and a memory storing browser application instructions that, when executed by the one or more processors, cause the computer system to perform operations that include:

enabling a user of the computer system to interact, using a browser application executing on the computer system, with a current user interface (UI) design file, the current UI design file comprising a design under edit for a particular UI;

automatically preloading, via the network communication interface and without user input from the user with respect to preloading, a set of UI design files of the user including the current UI design file, from a backend network computer system into browser memory of the computer system;

detecting an offline trigger on the computer system;

in response to detecting the offline trigger, initiating an offline mode on the browser application, the offline mode enabling the user to continue interacting with the current UI design file; and in response to detecting memory usage of the browser application exceeding a memory threshold, enabling the user to interact with an intervention menu listing memory consumption of the browser application related to the current UI design file.

2. The computer system of claim 1, wherein the operations include causing the browser application to automatically preload the set of UI design files of the user into the browser memory based on recency in which the user interacted with the set of UI design files.

3. The computer system of claim 1, wherein in the offline mode, the user is able to open and interact with the current UI design file and each UI design file in the set of UI design files.

4. The computer system of claim 3, wherein the executed instructions further cause the computer system to:

in the offline mode, processing change data corresponding to user input by the user interacting with the current UI design file; and when the network communication interface reconnects with the backend network computer system, synchronize the change data with the current UI design file stored in the backend computer system.

5. The computer system of claim 3, wherein the operations further include causing the computer system to:

in the offline mode, process change data corresponding to user input by the user interacting with a selected UI design file in the set of UI design files; and when the network communication interface reconnects with the backend network computer system, synchronize the change data with the selected UI design file stored in the backend computer system.

6. The computer system of claim 1, wherein the operations further include causing the computing system to:

in the offline mode:

receive user input from the user to create a new UI design file; and generate, on the display component, an interactive UI enabling the user to configure a new design under edit for the new UI design file.

7. The computer system of claim 6, wherein the operations further include causing the computer system to:

when the network communication interface reconnects with the backend network computer system, upload the new UI design file to the backend computer system to enable remote collaboration with the new UI design file.

8. The computer system of claim 1, wherein the operations include causing the browser application to automatically preload the set of UI design files of the user into the browser memory based on one or more aspects specific to the user.

9. The computer system of claim 8, wherein the one or more aspects correspond to the user being tagged or mentioned in a UI design file in the set of UI design files.

10. The computer system of claim 8, wherein the one or more aspects correspond to a routine of the user in interacting with a UI design file in the set of UI design files.

11. The computer system of claim 1, wherein the operations include causing the browser application to automatically preload the set of UI design files of the user into the browser memory based on one or more machine learning predictions that the user is likely to interact with each of the set of UI design files.

12. The computer system of claim 1, wherein the operations include causing the browser application to periodically and automatically saves change data in the browser memory based on the user interacting with the current UI design file.

13. The computer system of claim 12, wherein the operations include causing the browser application to periodically and automatically propagates the change data to the current UI design file stored in the backend computer system when the network communication interface is connected with the backend computer system.

14. The computer system of claim 1, wherein the current UI design facilitates collaboration between the user and a set of remote collaborators in editing the design under edit for the particular UI.

15. A non-transitory computer readable medium storing instructions that, when executed by one or more processors of a computing device, cause the computing device to perform operations comprising:

enabling a user of the computing device to interact, using a browser application executing on the computing device, with a current user interface (UI) design file, the current UI design file comprising a design under edit for a particular UI;

automatically preloading, via a network communication interface and without user input from the user with respect to preloading, a set of UI design files of the user, including the current UI design file, from a backend network computer system into browser memory of the computing device;

detecting an offline trigger on the computing device;

in response to detecting the offline trigger, initiating an offline mode on the browser application, the offline mode enabling the user to continue interacting with the current UI design file; and in response to detecting memory usage of the browser application exceeding a memory threshold, enabling the user to interact with an intervention menu listing memory consumption of the browser application related to the current UI design file.

16. The non-transitory computer readable medium of claim 15, wherein the operations include causing the browser application to automatically preload the set of UI design files of the user into the browser memory based on recency in which the user interacted with the set of UI design files.

17. The non-transitory computer readable medium of claim 15, wherein in the offline mode, the user is able to open and interact with the current UI design file and each UI design file in the set of UI design files.

18. The non-transitory computer readable medium of claim 17, wherein the operations further comprise:

in the offline mode, processing change data corresponding to user input by the user interacting with the current UI design file; and when the network communication interface reconnects with the backend network computer system, synchronizing the change data with the current UI design file stored in the backend computer system.

19. The non-transitory computer readable medium of claim 17, wherein the operations further comprise:

in the offline mode, processing change data corresponding to user input by the user interacting with a selected UI design file in the set of UI design files; and when the network communication interface reconnects with the backend network computer system, synchronizing the change data with the selected UI design file stored in the backend computer system.

20. A computer-implemented method of mitigating offline conditions, the method being performed by one or more processors of a computing device and comprising:

enabling a user of the computing device to interact, using a browser application, with a current user interface (UI) design file, the current UI design file comprising a design under edit for a particular UI;

automatically preloading, via a network communication interface and without user input from the user with respect to preloading, a set of UI design files of the user, including the current UI design file, from a backend network computer system into browser memory of the computing device;

detecting an offline trigger on the computing device;

in response to detecting the offline trigger, initiating an offline mode on the browser application, the offline mode enabling the user to continue interacting with the current UI design file; and in response to detecting memory usage of the browser application exceeding a memory threshold, enabling the user to interact with an intervention menu listing memory consumption of the browser application related to the current UI design file.

* * * * *